US012610046B2

(12) United States Patent
Li et al.

(10) Patent No.: US 12,610,046 B2
(45) Date of Patent: Apr. 21, 2026

(54) TAP-CONSTRAINED CONVOLUTIONAL CROSS-COMPONENT MODEL PREDICTION

(71) Applicant: GOOGLE LLC, Mountain View, CA (US)

(72) Inventors: Xiang Li, Saratoga, CA (US); In Suk Chong, Mountain View, CA (US); Debargha Mukherjee, Cupertino, CA (US); Cheng Chen, Milpitas, CA (US); Yaowu Xu, Saratoga, CA (US); Jingning Han, Santa Clara, CA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 18/987,529

(22) Filed: Dec. 19, 2024

(65) Prior Publication Data

US 2025/0220170 A1     Jul. 3, 2025

Related U.S. Application Data

(60) Provisional application No. 63/616,878, filed on Jan. 2, 2024.

(51) Int. Cl.
| | |
|---|---|
| *H04N 7/12* | (2006.01) |
| *H04N 19/117* | (2014.01) |
| *H04N 19/132* | (2014.01) |
| *H04N 19/176* | (2014.01) |
| *H04N 19/186* | (2014.01) |
| *H04N 19/80* | (2014.01) |

(52) U.S. Cl.
CPC ......... *H04N 19/117* (2014.11); *H04N 19/132* (2014.11); *H04N 19/176* (2014.11); *H04N 19/186* (2014.11); *H04N 19/80* (2014.11)

(58) Field of Classification Search
CPC ...................................................... H04N 19/11
See application file for complete search history.

(56) References Cited

FOREIGN PATENT DOCUMENTS

| | | |
|---|---|---|
| WO | 2023249901 A1 | 12/2023 |
| WO | 2023250115 A1 | 12/2023 |
| WO | 2024130123 A2 | 6/2024 |

*Primary Examiner* — Y Lee
(74) *Attorney, Agent, or Firm* — Young Basile Hanlon & MacFarlane, P.C.

(57) ABSTRACT

Tap-constrained convolutional cross-component model (CCCM) prediction enables hardware coder implementations of CCCM prediction by limiting the number of taps used to predict chroma samples while maintaining accuracy in the prediction. During encoding, a current luma sample of a block is identified. A number of taps to use for predicting a chroma sample associated with the current luma sample is determined based on a size of the block and/or whether the block is downsampled. The chroma sample is predicted using a prediction model limited to the number of taps and then encoded to an encoded bitstream. During decoding, a current luma sample of a block and a number of taps for predicting a chroma sample associated with the current luma sample are decoded from an encoded bitstream. The chroma sample is predicted using a prediction model limited to the number of taps and then output within an output video stream.

20 Claims, 11 Drawing Sheets 704
706
702

712

710

708

700

714

716

808

804

802

N

C

E

S

W

806

810

800

1300

1302
IDENTIFY CURRENT LUMA SAMPLE OF BLOCK TO ENCODE

1304
DETERMINE NUMBER OF TAPS TO USE FOR PREDICTING CHROMA SAMPLE ASSOCIATED WITH CURRENT LUMA SAMPLE

1306
PREDICT CHROMA SAMPLE USING PREDICTION MODEL LIMITED TO NUMBER OF TAPS

1308
ENCODE CURRENT LUMA SAMPLE AND NUMBER OF TAPS TO ENCODED BITSTREAM

1400

1402

DECODE CURRENT LUMA SAMPLE OF BLOCK FROM
ENCODED BITSTREAM

1404

DECODE NUMBER OF TAPS TO USE FOR PREDICTING
CHROMA SAMPLE ASSOCIATED WITH CURRENT LUMA
SAMPLE FROM ENCODED BITSTREAM

1406

PREDICT CHROMA SAMPLE USING PREDICTION MODEL
LIMITED TO NUMBER OF TAPS

1408

OUTPUT CHROMA SAMPLE WITHIN OUTPUT VIDEO
STREAM

TAP-CONSTRAINED CONVOLUTIONAL CROSS-COMPONENT MODEL PREDICTION

CROSS-REFERENCE TO RELATED APPLICATION(S)

This application claims the benefit of U.S. Provisional Application Ser. No. 63/616,878, filed Jan. 2, 2024, the entire disclosure of which is herein incorporated by reference.

BACKGROUND

Digital video streams may represent video using a sequence of frames or still images. Digital video can be used for various applications including, for example, video conferencing, high definition video entertainment, video advertisements, or sharing of user-generated videos. A digital video stream can contain a large amount of data and consume a significant amount of computing or communication resources of a computing device for processing, transmission, or storage of the video data. Various approaches have been proposed to reduce the amount of data in video streams, including encoding or decoding techniques.

SUMMARY

Disclosed herein are, inter alia, systems and techniques for tap-constrained convolutional cross-component model prediction.

A method for tap-constrained convolutional cross-component model prediction according to an implementation of this disclosure comprises: decoding a current luma sample of a block from an encoded bitstream; decoding a number of taps to use for predicting a chroma sample associated with the current luma sample from the encoded bitstream, wherein the number of taps is based on one or more of a size of the block or whether the block is downsampled; predicting the chroma sample using a prediction model limited to the number of taps; and outputting the chroma sample within an output video stream.

In some implementations of the method, taps of the number of taps are convolutional cross-component model prediction filter coefficients.

In some implementations of the method, where the number of taps is based on the size of the block, the number of taps is based on a comparison of the size of the block against a threshold number of chroma samples for the block to include.

In some implementations of the method, where the number of taps is based on whether the block is downsampled, the number of taps is based on whether one or both of the current luma sample or one or more other luma samples of the block are downsampled.

In some implementations of the method, the prediction model is one of: a first prediction model using, as the number of taps, three taps including a collocated luma sample, a non-linear term, and a bias term, a second prediction model using, as the number of taps, four taps including a collocated luma sample, a non-linear term of the collocated luma sample, and two spatially neighboring luma samples of the collocated luma sample, a third prediction model using, as the number of taps, four taps including a collocated luma sample, two spatially neighboring luma samples of the collocated luma sample, and a non-linear term of another spatially neighboring luma sample of the collocated luma sample, or a fourth prediction model using, as the number of taps, five taps including a collocated luma sample, a non-linear term of the collocated luma sample, and three spatially neighboring samples of the collocated luma samples.

In some implementations of the method, the prediction model is signaled within the encoded bitstream.

In some implementations of the method, predicting the chroma sample using the prediction model limited to the number of taps comprises: determining first values of taps of the number of taps based on predicted and reconstructed chroma samples in a reference area associated with a spatial neighborhood of the current luma sample; determining second values of samples of the prediction model; and weighting the second values using the first values.

In some implementations of the method, a size of the reference area is based on the number of taps.

A non-transitory computer readable medium according to an implementation of this disclosure has stored thereon an encoded bitstream, wherein the encoded bitstream is configured for decoding by operations comprising: decoding, from the encoded bitstream, a current luma sample of a block and a number of taps to use for predicting a chroma sample associated with the current luma sample; predicting the chroma sample using a prediction model limited to the number of taps; and outputting the chroma sample within an output video stream.

In some implementations of the non-transitory computer readable medium, the number of taps is based on one or more of a size of the block or whether the block is downsampled.

In some implementations of the non-transitory computer readable medium, where the number of taps is based on the size of the block and the size of the block meets a threshold number of chroma samples, the number of taps is a first number, and where the number of taps is based on the size of the block and the size of the block does not meet the threshold number of chroma samples, the number of taps is a second number less than the first number.

In some implementations of the non-transitory computer readable medium, where the number of taps is based on whether the block is downsampled and the block is downsampled, the number of taps is a first number, and where the number of taps is based on whether the block is downsampled and the block is not downsampled, the number of taps is a second number greater than the first number.

In some implementations of the non-transitory computer readable medium, taps of the number of taps are convolutional cross-component model prediction filter coefficients.

In some implementations of the non-transitory computer readable medium, the prediction model is signaled within the encoded bitstream.

An apparatus for tap-constrained convolutional cross-component model prediction according to an implementation of this disclosure comprises: a memory; and a processor configured to execute instructions stored in the memory to: predict, using a prediction model limited to a number of taps, a chroma sample associated with a current luma sample of a block, wherein the number of taps is based on one or more of a size of the block or whether the block is downsampled; and output the chroma sample within an output video stream.

In some implementations of the apparatus, where the number of taps is based on the size of the block, the number of taps is based on a comparison of the size of the block against a threshold number of chroma samples for the block to include, and where the number of taps is based on whether the block is downsampled, the number of taps is based on whether one or both of the current luma sample or one or more other luma samples of the block are downsampled.

In some implementations of the apparatus, the number of taps is a first number of taps where the size of the block meets the threshold number of chroma samples or a second number of taps where the size of the block does not meet the threshold number of chroma samples, and wherein the first number of taps is greater than the second number of taps.

In some implementations of the apparatus, the number of taps is a first number of taps where the block is down-sampled or a second number of taps where the block is not downsampled, and wherein the first number of taps is greater than the second number of taps.

In some implementations of the apparatus, the processor is configured to execute the instructions to: decode the number of taps and the current luma sample from an encoded bitstream.

In some implementations of the apparatus, taps of the number of taps are convolutional cross-component model prediction filter coefficients.

These and other aspects of this disclosure are disclosed in the following detailed description of the implementations, the appended claims and the accompanying figures.

BRIEF DESCRIPTION OF THE DRAWINGS

The description herein makes reference to the accompa-nying drawings described below, wherein like reference numerals refer to like parts throughout the several views.

DETAILED DESCRIPTION

Figure 1:
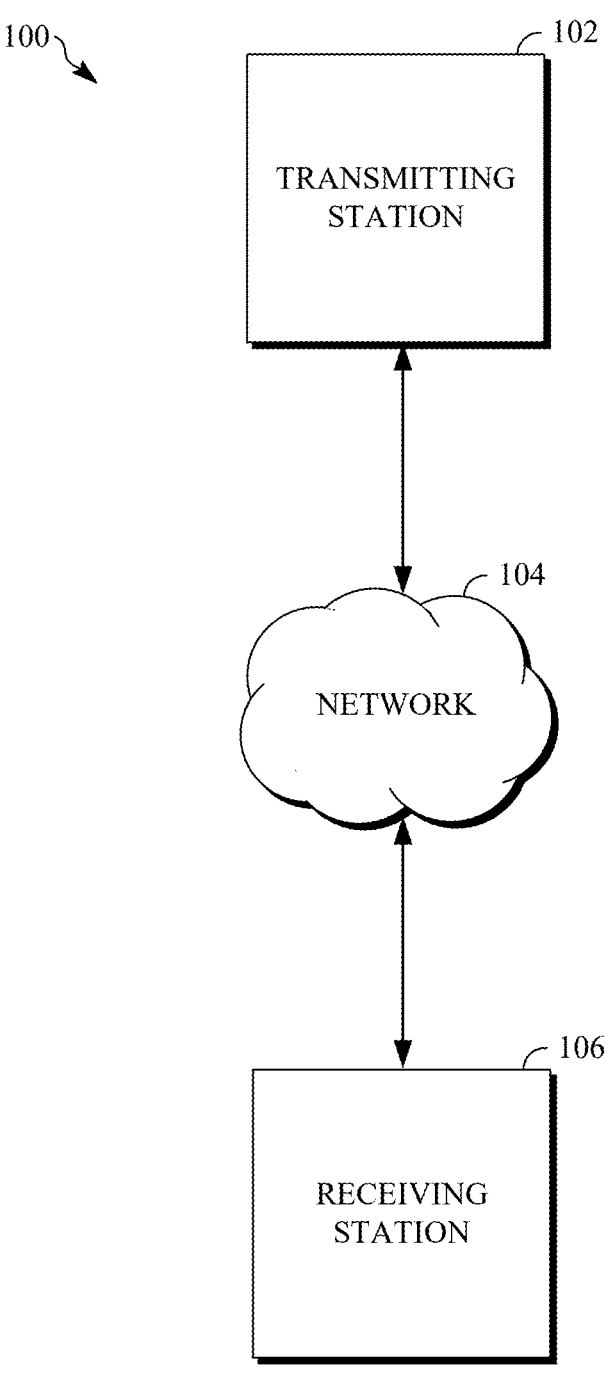
FIG. 1 is a schematic of an example of a video encoding and decoding system.

Video compression schemes may include breaking respective images, or frames, of a video stream into smaller portions, such as blocks, or coding tree units (CTUs), and generating an encoded bitstream using techniques to limit the information included for respective CTUs thereof. The bitstream can be decoded to re-create the source frames from the limited information. Encoding CTUs to or decoding CTUs from a bitstream can include predicting the values of pixels or CTUs based on similarities with other pixels or CTUs in the same frame which have already been coded. Those similarities can be determined using intra prediction, which attempts to predict the pixel values of a coding unit (CU) of a CTU using pixels peripheral to the CU (e.g., pixels that are in the same frame as the CU, but which are outside the CU). During encoding, the result of an intra-prediction mode performed against a CU is a prediction unit (PU). A prediction residual can be determined based on a difference between the pixel values of the CU and the pixel values of the PU. The prediction residual and the intra prediction mode used to ultimately obtain that prediction residual can then be encoded to a bitstream. During decoding, the pre-diction residual is reconstructed into a CU using a PU produced based on the intra prediction mode and is there-after included in an output video stream.

A CU includes a luminance, also referred to as luma, component and two chrominance, also referred to as chroma, components. These luma and chroma components may in some case be referred to as a luma block and chroma blocks. The luma component of a CU may, for example, be expressed within a Y plane of the CU and the chroma components may be expressed either within U and V planes or Cr and Cb planes of the CU. The luma component is understood to include some number of luma samples and each chroma component is understood to include some number of chroma samples. Generally, the luma samples provide measures of brightness throughout a subject CU and thus represents the structural qualities of the video content of the subject CU, whereas the chroma samples provide mea-sures of color throughout the subject CU. Because of this, conventional video compression schemes often use finer prediction approaches for predicting luma components of CUs than chroma components thereof. Such schemes may also utilize approaches directed to predicting those chroma components from the predicted luma components.

One example of such a chroma from luma prediction approach is cross-component linear model (CCLM) predic-tion as proposed for use with the H.266 codec, also referred to as Versatile Video Coding (VVC), which is used in intra-predicted CUs to predict a chroma signal based on a weighted luma signal. With CCLM prediction, chroma samples of a CU are predicted based on the reconstructed luma samples of the same CU by using a linear model represented as $pred\_C(i, j)=\alpha*rec\_L'(i, j)+\beta$, in which $pred\_C(i, j)$ represents the predicted chroma samples in a CU and $rec\_L'(i, j)$ represents the downsampled recon-structed luma samples of the same CU. The CCLM predic-tion parameters $\alpha$ and $\beta$ are weights derived, using one or more lookup tables, from at most four neighboring chroma samples and their corresponding downsampled luma samples. The downsampling is to align the resolutions of the luma and chroma components of the CU. In particular, where the resolutions of the luma and chroma components are already equal (e.g., 4:4:4), downsampling operations may be omitted; however, where the resolutions of the luma and chroma components are not equal (e.g., 4:2:0), such that the chroma components are generally smaller than the luma component, one or more downsampling filters may be applied to the luma samples within the luma component in both horizontal and vertical directions. Examples of the downsampling filters may include Type-0, in which each chroma sample exists between two vertical luma samples throughout the CU, and Type-2, in which a chroma sample coincides with the top-left luma sample of each 2×2 luma block. Due to the high correlation between luma and chroma values, CCLM prediction is generally more efficient than conventional chroma spatial prediction approaches when a CU is rich in textures, especially chroma textures.

While CCLM prediction offers benefits over historical approaches for chroma from luma prediction, there may be opportunities to further improve the accuracy and/or efficiency of CCLM prediction. One such opportunity relates to a newer approach to chroma from luma prediction that builds off of CCLM prediction, referred to as convolutional cross-component model (CCCM) prediction. CCCM prediction generally uses a seven-tap filter including a five-tap spatial component, a one-tap nonlinear term, and a one-tap bias term. The spatial component includes a current luma sample, C, and four neighbor samples referred to as N, S, E, and W (e.g., arranged in a plus, x, diamond, or other shape in which C in whichever such case is located in the middle). The non-linear term, P, is represented as a power of two of C and scaled to the sample value range of the content, represented as $P=(C*C+midVal)>>bitDepth$, in which bitDepth represents a bit precision for the video content and midVal is the middle chroma value within that bit precision. For example, for 10-bit video content, bitDepth would be equal to 10 and midVal would be equal to 512. The bias term, B, represents a scalar offset between the input and output, similar to the offset term in CCLM prediction, and is set to the middle chroma value for the bit precision (e.g., 512 for 10-bit video content)—thus, B is equal to midVal.

The output of CCCM prediction, a predicted chroma value based on C, is calculated as a convolution between filter coefficients $c_i$, in which the value of i is from 0 to 6, inclusive, and the input values and is clipped to the range of valid chroma samples. The predicted chroma value, predChroma Val, is represented as $predChroma\ Val=c_0C+c_1N+c_2S+c_3E+c_4W+c_5P+c_6B$. The filter coefficients $c_i$ are determined by minimizing a mean squared error (MSE) between predicted and reconstructed chroma samples in a reference area corresponding to one or more CTUs including a current CTU that includes the CU under prediction. In one example, the reference area may include N (e.g., 6) lines of chroma samples above and to the left of the CU, and the reference area may accordingly extend by one CU width to the right and one CU height below the CU boundaries. The reference area is adjusted to include only available chroma samples. An extension to the reference area, represented as one sample surrounding the perimeter of the actual reference area, may be provided to support the chroma samples along the sides of the reference area when such side samples are otherwise unavailable. The MSE minimization is performed by calculating an autocorrelation matrix for the luma input sample and a cross-correlation vector between the luma input sample and the predicted chroma output sample.

While CCCM prediction offers many improvements over CCLM prediction alone, it is not without its drawbacks. In particular, CCCM prediction incurs significant latency, which renders hardware coder implementations impracticable or impossible. To ensure high prediction accuracy, the filter coefficients (i.e., taps) used in CCCM prediction are 22-bit. Given that CCCM prediction requires a number of 64-bit division operations with arbitrary denominators to be sequentially performed for deriving the filter coefficients $c_i$, this derivation is very computationally expensive. There is therefore typically a long latency introduced by CCCM prediction for deriving the values of the filter coefficients. This latency is particularly pronounced in hardware coders (i.e., combined hardware encoders and decoders or separate hardware encoders and hardware decoders), which are limited to only a certain amount of processing per cycle and which generally have a limited number of cycle budgets for small CUs. The amount of latency imposed by CCCM prediction is thus based on the number of taps used. However, an increase in the number of taps is generally correlated with a better prediction accuracy given that a greater number of samples are involved in the prediction. It would thus be desirable to determine an optimal number of taps to use for CCCM prediction that prevents quality loss or otherwise reduces quality loss to an acceptable range and to constrain (i.e., limit) the prediction process to that number of taps.

Implementations of this disclosure address problems such as these using tap-constrained CCCM prediction by which a chroma sample is predicted for a current luma sample using a prediction model limited to a certain number of taps. During encoding implementations of this disclosure, a current luma sample of a block to encode is identified. A number of taps to use for predicting a chroma sample associated with the current luma sample is determined based on one or more of a size of the block or whether the block is downsampled. The chroma sample is predicted using a prediction model limited to the number of taps. The chroma sample and the number of taps are then encoded to an encoded bitstream. During decoding implementations of this disclosure, a current luma sample of a block is decoded from an encoded bitstream. A number of taps to use for predicting a chroma sample associated with the current luma sample is also decoded from the encoded bitstream, in which the number of taps is (i.e., was determined during encoding) based on one or more of a size of the block or whether the block is downsampled. The chroma sample is predicted using a prediction model limited to the number of taps. The chroma sample is then output within an output video stream. The tap constraint approaches disclosed herein introduce meaningful limitations to the generally highly resource-intensive CCCM prediction process. The approaches disclosed herein thus materially reduce the latency of the coding process to enable CCCM prediction to be performed in a hardware coder.

While reference is made herein by example to CTUs, CUs, PUs, and the like, as are commonly used in video codecs such as H.265, referred to as High-Efficiency Video Coding (HEVC), and H.266, the implementations of this disclosure may be used with other video coding structures. In one particular but non-limiting example, the implementations of this disclosure may be used with superblocks, macroblocks, blocks, and the like, as are commonly used in video codecs such as VP9, AV1, and the currently in-development AV2. Accordingly, references herein to particular video coding structures such as CTUs, CUs, PUs, and the like shall be regarded as expressions of non-limiting example video coding structures with which the implementations of this disclosure may be used.

Further details of techniques for tap-constrained convolutional cross-component model prediction are described herein with initial reference to a system in which such techniques can be implemented. FIG. 1 is a schematic of an example of a video encoding and decoding system 100. A transmitting station 102 can be, for example, a computer having an internal configuration of hardware such as that described in FIG. 2. However, other implementations of the transmitting station 102 are possible. For example, the processing of the transmitting station 102 can be distributed among multiple devices.

A network 104 can connect the transmitting station 102 and a receiving station 106 for encoding and decoding of the video stream. Specifically, the video stream can be encoded in the transmitting station 102, and the encoded video stream can be decoded in the receiving station 106. The network 104 can be, for example, the Internet. The network 104 can also be a local area network (LAN), wide area network (WAN), virtual private network (VPN), cellular telephone network, or any other means of transferring the video stream from the transmitting station 102 to, in this example, the receiving station 106.

Figure 2:
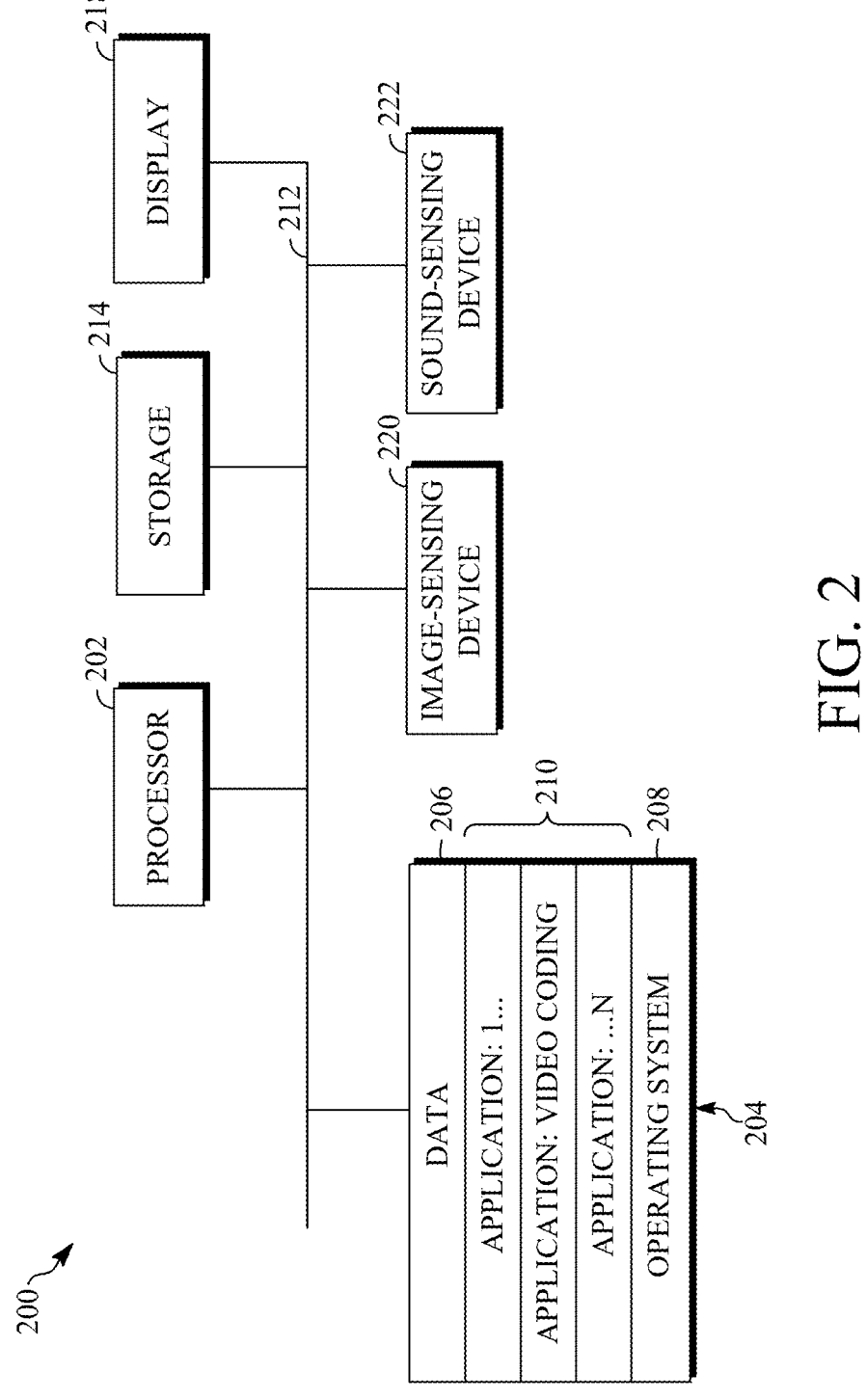
FIG. 2 is a block diagram of an example of a computing device that can implement a transmitting station or a receiv-ing station.

The receiving station 106, in one example, can be a computer having an internal configuration of hardware such as that described in FIG. 2. However, other suitable implementations of the receiving station 106 are possible. For example, the processing of the receiving station 106 can be distributed among multiple devices.

Other implementations of the video encoding and decoding system 100 are possible. For example, an implementation can omit the network 104. In another implementation, a video stream can be encoded and then stored for transmission at a later time to the receiving station 106 or any other device having memory. In one implementation, the receiving station 106 receives (e.g., via the network 104, a computer bus, and/or some communication pathway) the encoded video stream and stores the video stream for later decoding. In an example implementation, a real-time transport protocol (RTP) is used for transmission of the encoded video over the network 104. In another implementation, a transport protocol other than RTP may be used (e.g., a Hypertext Transfer Protocol-based (HTTP-based) video streaming protocol).

When used in a video conferencing system, for example, the transmitting station 102 and/or the receiving station 106 may include the ability to both encode and decode a video stream as described below. For example, the receiving station 106 could be a video conference participant who receives an encoded video bitstream from a video conference server (e.g., the transmitting station 102) to decode and view and further encodes and transmits his or her own video bitstream to the video conference server for decoding and viewing by other participants.

In some implementations, the video encoding and decoding system 100 may instead be used to encode and decode data other than video data. For example, the video encoding and decoding system 100 can be used to process image data. The image data may include a block of data from an image (e.g., a CTU of a frame of a video stream). In such an implementation, the transmitting station 102 may be used to encode the image data and the receiving station 106 may be used to decode the image data.

Alternatively, the receiving station 106 can represent a computing device that stores the encoded image data for later use, such as after receiving the encoded or pre-encoded image data from the transmitting station 102. As a further alternative, the transmitting station 102 can represent a computing device that decodes the image data, such as prior to transmitting the decoded image data to the receiving station 106 for display.

FIG. 2 is a block diagram of an example of a computing device 200 that can implement a transmitting station or a receiving station. For example, the computing device 200 can implement one or both of the transmitting station 102 and the receiving station 106 of FIG. 1. The computing device 200 can be in the form of a computing system including multiple computing devices, or in the form of one computing device, for example, a mobile phone, a tablet computer, a laptop computer, a notebook computer, a desktop computer, and the like.

A processor 202 in the computing device 200 can be a conventional central processing unit. Alternatively, the processor 202 can be another type of device, or multiple devices, capable of manipulating or processing information now existing or hereafter developed. For example, although the disclosed implementations can be practiced with one processor as shown (e.g., the processor 202), advantages in speed and efficiency can be achieved by using more than one processor.

A memory 204 in computing device 200 can be a read only memory (ROM) device or a random access memory (RAM) device in an implementation. However, other suitable types of storage device can be used as the memory 204. The memory 204 can include code and data 206 that is accessed by the processor 202 using a bus 212. The memory 204 can further include an operating system 208 and application programs 210, the application programs 210 including at least one program that permits the processor 202 to perform the techniques described herein. For example, the application programs 210 can include applications 1 through N, which further include encoding and/or decoding software that performs, amongst other things, enhanced multi-stage intra prediction as described herein.

The computing device 200 can also include a secondary storage 214, which can, for example, be a memory card used with a mobile computing device. Because the video communication sessions may contain a significant amount of information, they can be stored in whole or in part in the secondary storage 214 and loaded into the memory 204 as needed for processing.

The computing device 200 can also include one or more output devices, such as a display 218. The display 218 may be, in one example, a touch sensitive display that combines a display with a touch sensitive element that is operable to sense touch inputs. The display 218 can be coupled to the processor 202 via the bus 212. Other output devices that permit a user to program or otherwise use the computing device 200 can be provided in addition to or as an alternative to the display 218. When the output device is or includes a display, the display can be implemented in various ways, including by a liquid crystal display (LCD), a cathode-ray tube (CRT) display, or a light emitting diode (LED) display, such as an organic LED (OLED) display.

The computing device 200 can also include or be in communication with an image-sensing device 220, for example, a camera, or any other image-sensing device 220 now existing or hereafter developed that can sense an image such as the image of a user operating the computing device 200. The image-sensing device 220 can be positioned such that it is directed toward the user operating the computing device 200. In an example, the position and optical axis of the image-sensing device 220 can be configured such that the field of vision includes an area that is directly adjacent to the display 218 and from which the display 218 is visible.

The computing device 200 can also include or be in communication with a sound-sensing device 222, for example, a microphone, or any other sound-sensing device now existing or hereafter developed that can sense sounds near the computing device 200. The sound-sensing device 222 can be positioned such that it is directed toward the user operating the computing device 200 and can be configured to receive sounds, for example, speech or other utterances, made by the user while the user operates the computing device 200.

Although FIG. 2 depicts the processor 202 and the memory 204 of the computing device 200 as being integrated into one unit, other configurations can be utilized. The operations of the processor 202 can be distributed across multiple machines (wherein individual machines can have one or more processors) that can be coupled directly or across a local area or other network. The memory 204 can be distributed across multiple machines such as a network-based memory or memory in multiple machines performing the operations of the computing device 200.

Although depicted here as one bus, the bus 212 of the computing device 200 can be composed of multiple buses. Further, the secondary storage 214 can be directly coupled to the other components of the computing device 200 or can be accessed via a network and can comprise an integrated unit such as a memory card or multiple units such as multiple memory cards. The computing device 200 can thus be implemented in a wide variety of configurations.

Figure 3:
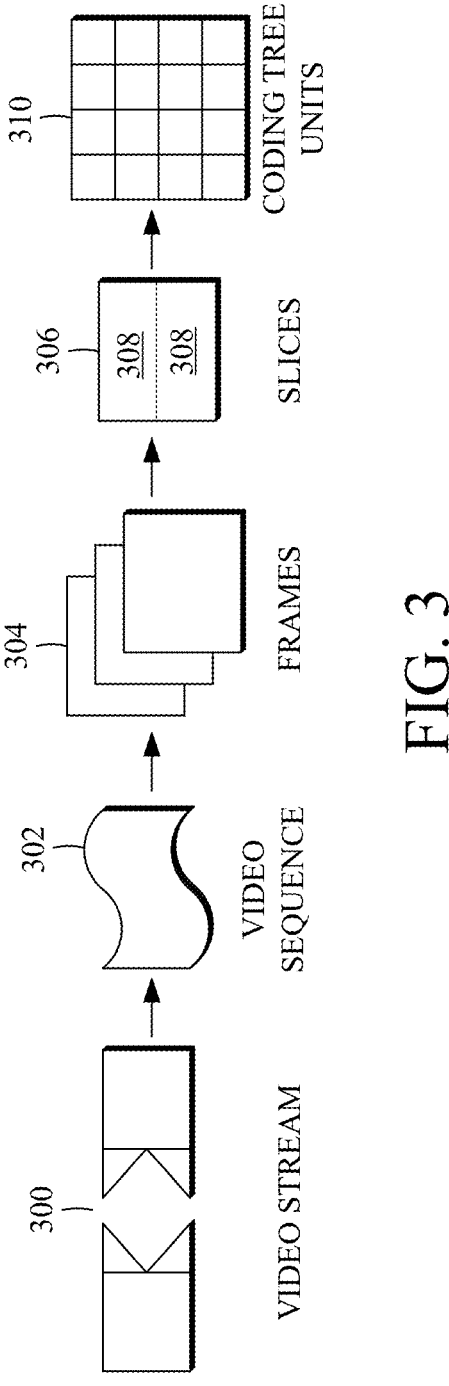
FIG. 3 is a diagram of an example of a video stream to be encoded and decoded.

FIG. 3 is a diagram of an example of a video stream 300 to be encoded and decoded. The video stream 300 includes a video sequence 302. At the next level, the video sequence 302 includes a number of adjacent video frames 304. While three frames are depicted as the adjacent frames 304, the video sequence 302 can include any number of adjacent frames 304. The adjacent frames 304 can then be further subdivided into individual video frames, for example, a frame 306.

At the next level, the frame 306 can be divided into a series of planes or segments 308. The segments 308 can be subsets of frames that permit parallel processing, for example. The segments 308 can also be subsets of frames that can separate the video data into separate colors. For example, a frame 306 of color video data can include a luminance plane and two chrominance planes. The segments 308 may be sampled at different resolutions.

Whether or not the frame 306 is divided into slices 308, the frame 306 may be further subdivided into CTUs 310, which can contain data corresponding to, for example, N×M pixels in the frame 306, in which N and M may refer to the same integer value or to different integer values. The CTUs 310 can also be arranged to include data from one or more slices 308 of pixel data. The CTUs 310 can be of any suitable size, such as 4×4 pixels, 8×8 pixels, 16×8 pixels, 8×16 pixels, 16×16 pixels, or larger up to a maximum size, which may be 128×128 pixels or another N×M pixels size.

Figure 4:
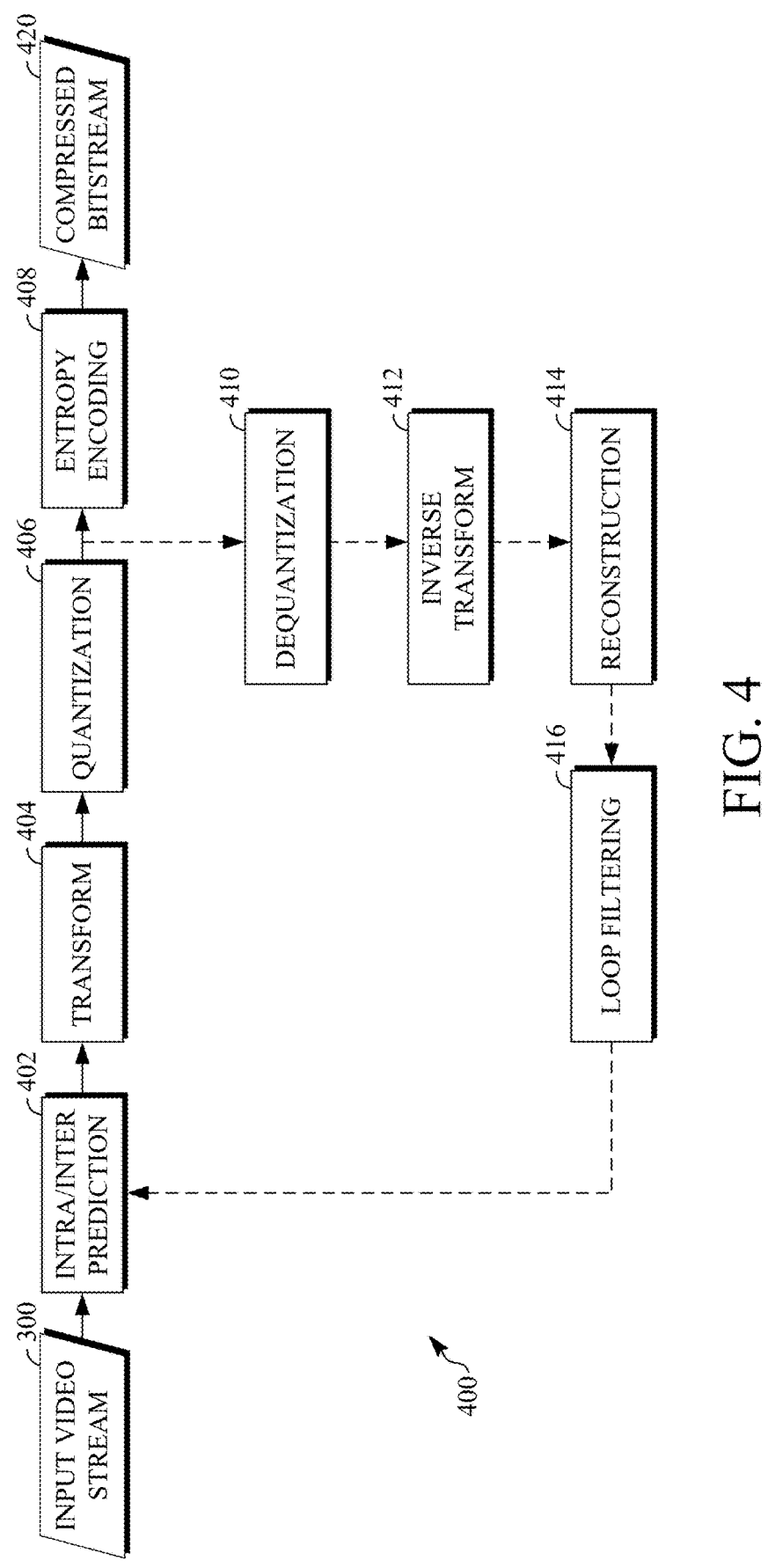
FIG. 4 is a block diagram of an example of an encoder.

FIG. 4 is a block diagram of an example of an encoder 400. The encoder 400 can be implemented, as described above, in the transmitting station 102, such as by providing a computer software program stored in memory, for example, the memory 204. The computer software program can include machine instructions that, when executed by a processor such as the processor 202, cause the transmitting station 102 to encode video data in the manner described in FIG. 4. The encoder 400 can also be implemented as specialized hardware included in, for example, the transmitting station 102. In some implementations, the encoder 400 is a hardware encoder.

The encoder 400 has the following stages to perform the various functions in a forward path (shown by the solid connection lines) to produce an encoded or compressed bitstream 420 using the video stream 300 as input: an intra/inter prediction stage 402, a transform stage 404, a quantization stage 406, and an entropy encoding stage 408. The encoder 400 may also include a reconstruction path (shown by the dotted connection lines) to reconstruct a frame for encoding of future CTUs. In FIG. 4, the encoder 400 has the following stages to perform the various functions in the reconstruction path: a dequantization stage 410, an inverse transform stage 412, a reconstruction stage 414, and a loop filtering stage 416. Other structural variations of the encoder 400 can be used to encode the video stream 300.

In some cases, the functions performed by the encoder 400 may occur after a filtering of the video stream 300. That is, the video stream 300 may undergo pre-processing according to one or more implementations of this disclosure prior to the encoder 400 receiving the video stream 300. Alternatively, the encoder 400 may itself perform such pre-processing against the video stream 300 prior to proceeding to perform the functions described with respect to FIG. 4, such as prior to the processing of the video stream 300 at the intra/inter prediction stage 402.

When the video stream 300 is presented for encoding after the pre-processing is performed, respective adjacent frames 304, such as the frame 306, can be processed in units of CTUs. At the intra/inter prediction stage 402, respective CUs of a CTU can be encoded using intra-frame prediction (also called intra-prediction) or inter-frame prediction (also called inter-prediction). In any case, a PU can be formed. In the case of intra-prediction, a PU may be formed from samples in the current frame that have been previously encoded and reconstructed. In the case of inter-prediction, a PU may be formed from samples in one or more previously constructed reference frames.

Next, the PU can be subtracted from the CU at the intra/inter prediction stage 402 to produce a prediction residual, also called a residual. The transform stage 404 transforms the residual into transform coefficients in, for example, the frequency domain using block-based transforms. The quantization stage 406 converts the transform coefficients into discrete quantum values, which are referred to as quantized transform coefficients, using a quantizer value or a quantization level. For example, the transform coefficients may be divided by the quantizer value and truncated.

The quantized transform coefficients are then entropy encoded by the entropy encoding stage 408. The entropy-encoded coefficients, together with other information used to decode the CU (which may include, for example, syntax elements such as used to indicate the type of prediction used, transform type, motion vectors, a quantizer value, or the like), are then output to the compressed bitstream 420. The compressed bitstream 420 can be formatted using various techniques, such as variable length coding or arithmetic coding. The compressed bitstream 420 can also be referred to as an encoded video stream or encoded video bitstream, and the terms will be used interchangeably herein.

The reconstruction path (shown by the dotted connection lines) can be used to ensure that the encoder 400 and a decoder 500 (described below with respect to FIG. 5) use the same reference frames to decode the compressed bitstream 420. The reconstruction path performs functions that are similar to functions that take place during the decoding process (described below with respect to FIG. 5), including dequantizing the quantized transform coefficients at the dequantization stage 410 and inverse transforming the dequantized transform coefficients at the inverse transform stage 412 to produce a derivative prediction residual (also called a derivative residual). At the reconstruction stage 414, the PU that was predicted at the intra/inter prediction stage 402 can be added to the derivative residual to create a reconstructed CU. The loop filtering stage 416 can apply an in-loop filter or other filter to the reconstructed CU to reduce distortion such as blocking artifacts. Examples of filters which may be applied at the loop filtering stage 416 include, without limitation, a deblocking filter, a directional enhancement filter, and a loop restoration filter.

Other variations of the encoder 400 can be used to encode the compressed bitstream 420. In some implementations, a non-transform based encoder can quantize the residual signal directly without the transform stage 404 for certain CUs, CTUs, or frames. In some implementations, an encoder can have the quantization stage 406 and the dequantization stage 410 combined in a common stage.

Figure 5:
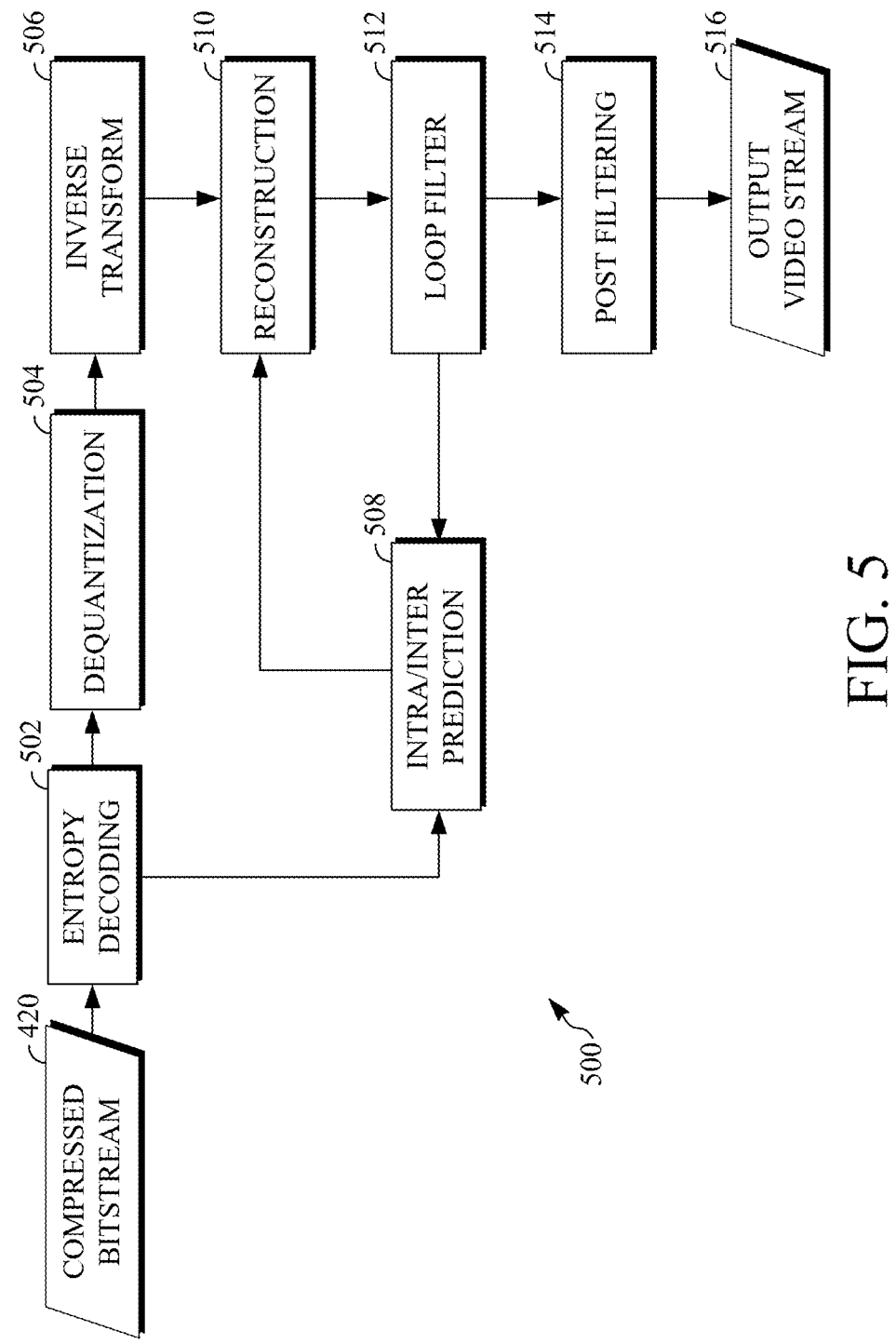
FIG. 5 is a block diagram of an example of a decoder.

FIG. 5 is a block diagram of an example of a decoder 500. The decoder 500 can be implemented in the receiving station 106, for example, by providing a computer software program stored in the memory 204. The computer software program can include machine instructions that, when executed by a processor such as the processor 202, cause the receiving station 106 to decode video data in the manner described in FIG. 5. The decoder 500 can also be implemented in hardware included in, for example, the transmitting station 102 or the receiving station 106. In some implementations, the decoder 500 is a hardware decoder.

The decoder 500, similar to the reconstruction path of the encoder 400 discussed above, includes in one example the following stages to perform various functions to produce an output video stream 516 from the compressed bitstream 420: an entropy decoding stage 502, a dequantization stage 504, an inverse transform stage 506, an intra/inter prediction stage 508, a reconstruction stage 510, a loop filtering stage 512, and a post filter stage 514. Other structural variations of the decoder 500 can be used to decode the compressed bitstream 420.

When the compressed bitstream 420 is presented for decoding, the data elements within the compressed bitstream 420 can be decoded by the entropy decoding stage 502 to produce a set of quantized transform coefficients. The dequantization stage 504 dequantizes the quantized transform coefficients (e.g., by multiplying the quantized transform coefficients by the quantizer value), and the inverse transform stage 506 inverse transforms the dequantized transform coefficients to produce a derivative residual that can be identical to that created by the inverse transform stage 412 in the encoder 400. Using header information decoded from the compressed bitstream 420, the decoder 500 can use the intra/inter prediction stage 508 to create the same PU as was created in the encoder 400 (e.g., at the intra/inter prediction stage 402).

At the reconstruction stage 510, the PU can be added to the derivative residual to create a reconstructed CU. The loop filtering stage 512 can be applied to the reconstructed CU to reduce blocking artifacts. Examples of filters which may be applied at the loop filtering stage 512 include, without limitation, a deblocking filter, a directional enhancement filter, and a loop restoration filter. Other filtering can be applied to the reconstructed CU. In this example, the post filter stage 514 is applied to the reconstructed CU to reduce blocking distortion, and the result is output as the output video stream 516. The output video stream 516 can also be referred to as a decoded video stream, and the terms will be used interchangeably herein.

Other variations of the decoder 500 can be used to decode the compressed bitstream 420. In some implementations, the decoder 500 can produce the output video stream 516 without the post filter stage 514 or otherwise omit the post filter stage 514.

Figure 6:
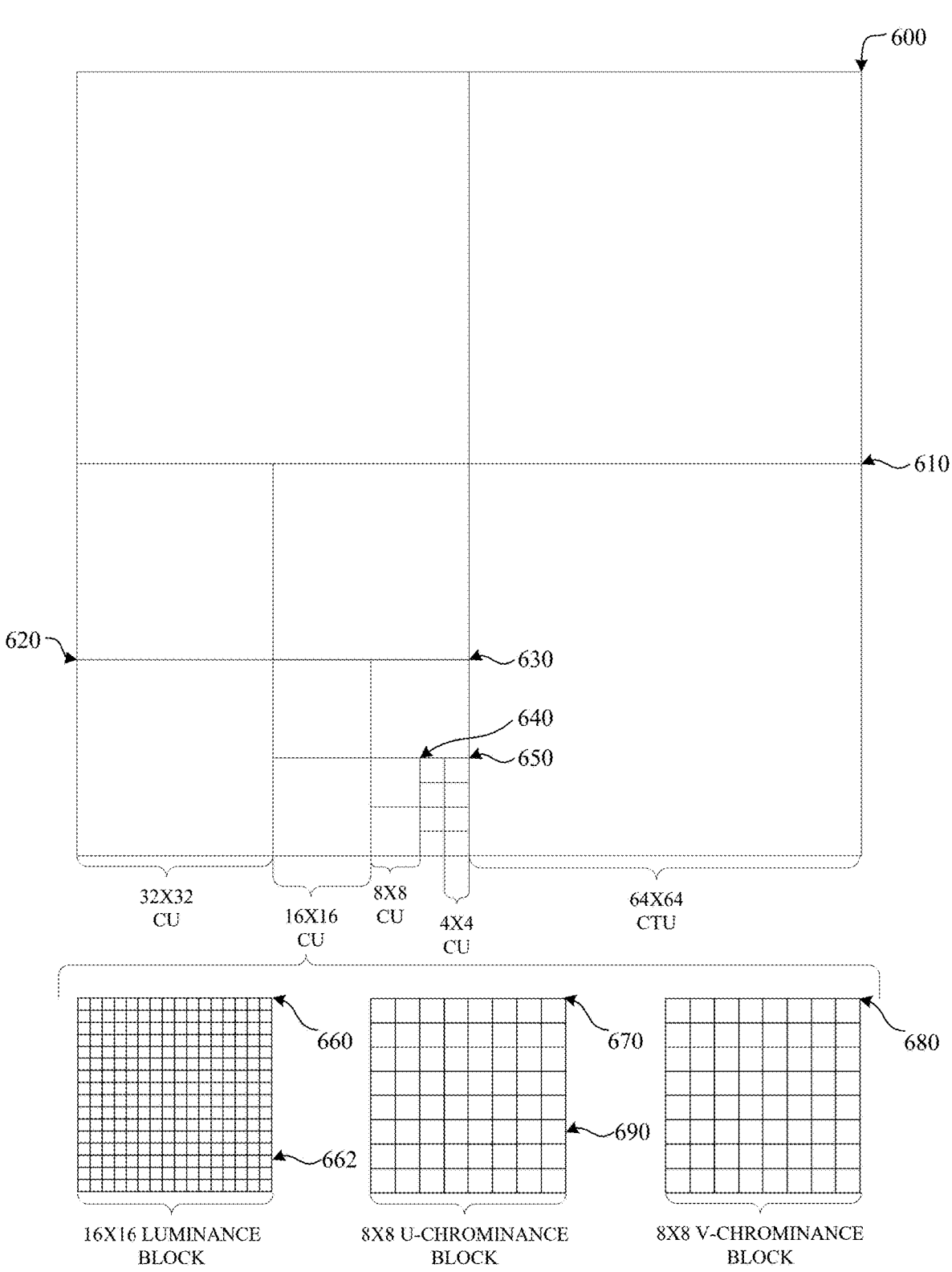
FIG. 6 is an illustration of examples of portions of a video frame.

FIG. 6 is an illustration of examples of portions of a video frame 600, which may, for example, be the frame 306 shown in FIG. 3. The video frame 600 includes a number of 64×64 CTUs, such as four 64×64 CTUs 610 in two rows and two columns in a matrix or Cartesian plane, as shown. Each 64×64 CTU 610 may include up to four 32×32 CUs 620.

Each 32×32 CU 620 may include up to four 16×16 CUs 630. Each 16×16 CU 630 may include up to four 8×8 CUs 640. Each 8×8 CU 640 may include up to four 4×4 CUs 950. Each 4×4 CU 950 may include 16 pixels, which may be represented in four rows and four columns in each respective CU in the Cartesian plane or matrix.

In some implementations, the video frame 600 may include CTUs larger than 64×64 and/or CUs smaller than 4×4. Subject to features within the video frame 600 and/or other criteria, the video frame 600 may be partitioned into various arrangements. Although one arrangement of CUs is shown, any arrangement may be used. Although FIG. 6 shows N×N CTUs and CUs, in some implementations, N×M CTUs and/or CUs may be used, wherein N and M are different numbers. For example, 32×64 CTUs, 64×32 CTUs, 16×32 CUs, 32×16 CUs, or any other size may be used. In some implementations, N×2N CTUs or CUs, 2N×N CTUs or CUs, or a combination thereof, may be used.

The pixels may include information representing an image captured in the video frame 600, such as luminance information, color information, and location information. In some implementations, a block, such as a 16×16 pixel block as shown, may include a luminance block 660, which may include luminance pixels 662; and two chrominance blocks 670, 680, such as a U or Cb chrominance block 670, and a V or Cr chrominance block 680. The chrominance blocks 670, 680 may include chrominance pixels 690. For example, the luminance block 660 may include 16×16 luminance pixels 662 and each chrominance block 670, 680 may include 8×8 chrominance pixels 690 as shown.

In some implementations, coding the video frame 600 may include ordered block-level coding. Ordered block-level coding may include coding CUs of the video frame 600 in an order, such as raster-scan order, wherein CUs may be identified and processed starting with a CTU in the upper left corner of the video frame 600, or portion of the video frame 600, and proceeding along rows from left to right and from the top row to the bottom row, identifying each CU in turn for processing. For example, the 64×64 CTU in the top row and left column of the video frame 600 may be the first CTU coded and the 64×64 CTU immediately to the right of the first CTU may be the second CTU coded. The second row from the top may be the second row coded, such that the 64×64 CTU in the left column of the second row may be coded after the 64×64 CTU in the rightmost column of the first row.

In some implementations, coding a CTU of the video frame 600 may include using quad-tree coding, which may include coding smaller CUs within a CTU in raster-scan order. For example, the 64×64 CTU shown in the bottom left corner of the portion of the video frame 600 may be coded using quad-tree coding wherein the top left 32×32 CU may be coded, then the top right 32×32 CU may be coded, then the bottom left 32×32 CU may be coded, and then the bottom right 32×32 CU may be coded. Each 32×32 CU may be coded using quad-tree coding wherein the top left 16×16 CU may be coded, then the top right 16×16 CU may be coded, then the bottom left 16×16 CU may be coded, and then the bottom right 16×16 CU may be coded. Each 16×16 CU may be coded using quad-tree coding wherein the top left 8×8 CU may be coded, then the top right 8×8 CU may be coded, then the bottom left 8×8 CU may be coded, and then the bottom right 8×8 CU may be coded. Each 8×8 CU may be coded using quad-tree coding wherein the top left 4×4 CU may be coded, then the top right 4×4 CU may be coded, then the bottom left 4×4 CU may be coded, and then the bottom right 4×4 CU may be coded. In some implementations, 8×8 CUs may be omitted for a 16×16 CU, and the 16×16 CU may be coded using quad-tree coding wherein the top left 4×4 CU may be coded, then the other 4×4 CUs in the 16×16 CU may be coded in raster-scan order.

In some implementations, coding the video frame 600 may include encoding the information included in the original version of the image or video frame by, for example, omitting some of the information from that original version of the image or video frame from a corresponding encoded image or encoded video frame. For example, the coding may include reducing spectral redundancy, reducing spatial redundancy, or a combination thereof. Reducing spectral redundancy may include using a color model based on a luminance component (Y) and two chrominance components (U and V or Cb and Cr), which may be referred to as the YUV or YCbCr color model, or color space. Using the YUV color model may include using a relatively large amount of information to represent the luminance component of a portion of the video frame 600, and using a relatively small amount of information to represent each corresponding chrominance component for the portion of the video frame 600. For example, a portion of the video frame 600 may be represented by a high-resolution luminance component, which may include a 16×16 block of luma samples, and by two lower resolution chrominance components, each of which represents the portion of the image as an 8×8 block of chroma samples. A sample may indicate a value, for example, a value in the range from 0 to 255, and may be stored or transmitted using, for example, eight bits. Although this disclosure is described in reference to the YUV color model, another color model may be used. Reducing spatial redundancy may include transforming a CU into the frequency domain using, for example, a discrete cosine transform. For example, a unit of an encoder may perform a discrete cosine transform using transform coefficient values based on spatial frequency.

Although described herein with reference to matrix or Cartesian representation of the video frame 600 for clarity, the video frame 600 may be stored, transmitted, processed, or a combination thereof, in a data structure such that pixel values and/or luma and chroma samples may be efficiently represented for the video frame 600. For example, the video frame 600 may be stored, transmitted, processed, or any combination thereof, in a two-dimensional data structure such as a matrix as shown, or in a one-dimensional data structure, such as a vector array. Furthermore, although described herein as showing a chrominance subsampled image where U and V have half the resolution of Y, the video frame 600 may have different configurations for the color channels thereof. For example, referring still to the YUV color space, full resolution may be used for all color channels of the video frame 600. In another example, a color space other than the YUV color space may be used to represent the resolution of color channels of the video frame 600.

Figures 7, 8:
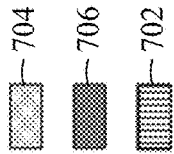
FIG. 7 illustrates an example of a reference area for convolutional cross-component model prediction.
FIG. 8 illustrates an example of a neighborhood of a luma sample used to predict a chroma sample.

FIG. 7 illustrates an example of a reference area 700 for CCCM prediction. The reference area 700 illustrates chroma samples corresponding to multiple CUs, in which certain of those chroma samples are filled with patterns 702, 704, and 706. In particular, chroma samples filled with the pattern 702 correspond to a current PU 708 undergoing prediction, chroma samples filled with the pattern 704 are reconstructed chroma samples available for predicting chroma samples filled with the pattern 702, and chroma samples filled with the pattern 706 represent a padded area used to extend the reference area to accommodate predictions for chroma samples located along the edges of the chroma samples filled with the pattern 704. In that the chroma samples filled with the pattern 706 are not available within the current CU itself or immediately neighboring CUs, they may be understood to contain (i.e., be set to) a padding value. While the PU 708 is shown as being of size 8×4, the disclosure is not limited to particular PU sizes.

The reference area 700 may include a top region 710 that may include 1 to N (where N>1) rows of pixels. The reference area 700 may include a top-right region 712 that includes 1 to N rows. The reference area 700 may include a left region 714 of 1 to M (where M>1) columns of pixels. The reference area 700 may include a bottom-left region 716 of 1 to M (where M>1) columns of pixels. In an example, N=M. The reference area 700 may be based on the chroma color format. For example, for 4:4:4 content, the reference area 700 can also be 4-sample wide; and for 4:2:0 or 4:2:2 color formats, the reference area 700 can be 2-sample wide. In an example, when the top-right region 712 is available, only a 4×4 luma block at the top-right is included in the reference area 700. Similarly, if the bottom-left region 716 is available, only a 4×4 luma block at bottom-right is included in the reference area 700. The reference area 700 can be adjusted accordingly based on the chroma color format. In another example, the top region 710 may always be 1-sample wide for both luma and chroma while the left region 714 may be 4-sample wide for luma.

FIG. 8 illustrates an example of a neighborhood 800 of a luma sample 802 used to predict a chroma sample. The neighborhood 800 illustrates a 3×3 neighborhood by example. In some cases, the neighborhood 800 can be larger or smaller than 3×3 and/or the neighborhood 800 can be a shape other than a square, such as a non-square rectangular or a diamond. The luma sample 802 is located within the middle of the neighborhood 800. The luma sample 802, which is labeled C to indicate it is the current luma sample under processing, is surrounded within the neighborhood 802 by neighboring luma samples 804, 806, 808, and 810, which will be used to predict a chroma sample associated with the luma sample 802. In the example shown, the luma samples 804, 806, 808, and 810 are respectively labeled using directional names N, S, E, and W (i.e., north, south, east, and west) relative to a location of the luma sample 802. Together, the luma sample 802 and the neighboring luma samples 804, 806, 808, and 810 comprise the values of the five-tap spatial component used in CCCM prediction, and which are used to calculate the predicted chroma sample associated with the luma sample 802, represented as $predChromaVal=c_0C+c_1N+c_2S+c_3E+c_4W+c_5P+c_6B$, in which the filter coefficients $c_i$ may be derived using one or more simplification approaches as disclosed herein.

Figure 9:
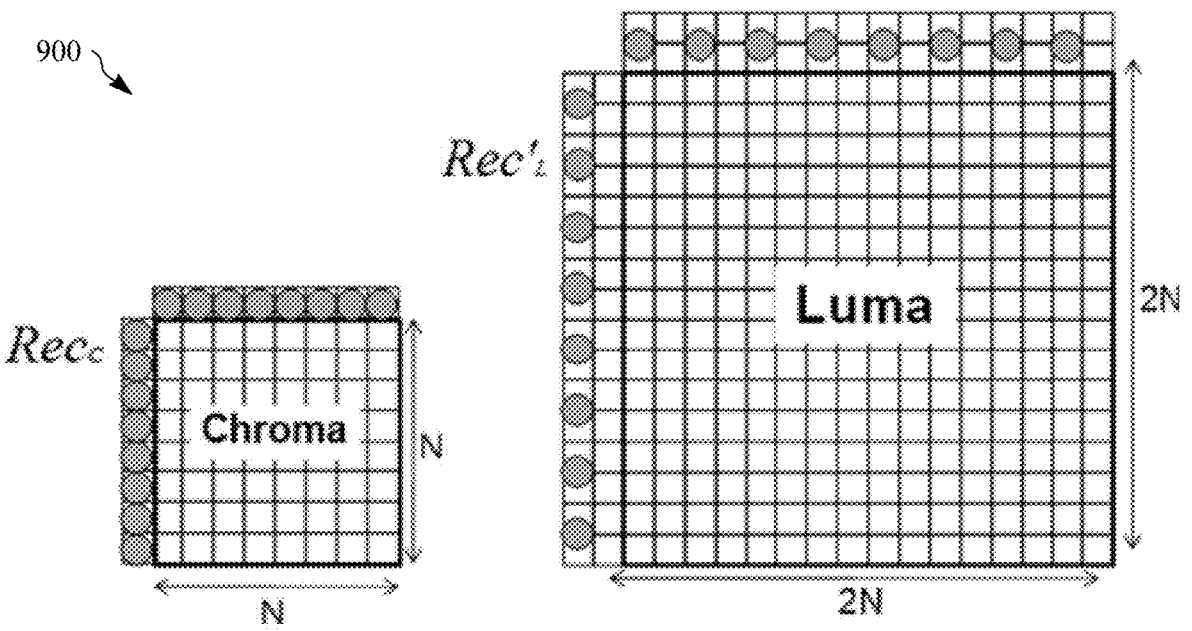
FIG. 9 illustrates example resolutions of luma and chroma blocks.

FIG. 9 illustrates example resolutions of luma and chroma blocks. In some cases, to ensure that appropriate luma samples are used to predict chroma samples for a given CU, it may be desirable to downsample (i.e., decrease a resolution of) the luma block for the CU under processing so that the resulting resolution of that luma block is the same as a resolution of the chroma blocks for the CU (e.g., 4-4-4 or a non-4-4-4 case). For example, downsampling may be performed where the resolutions of the luma and chroma blocks are initially provided in a format such as 4:2:0. Thus, a block may be considered downsampled where it includes downsampled luma samples. However, where the resolutions of the luma and chroma blocks for a given CU are already the same (e.g., 4-4-4), downsampling operations may be skipped for the CU.

Figure 10:
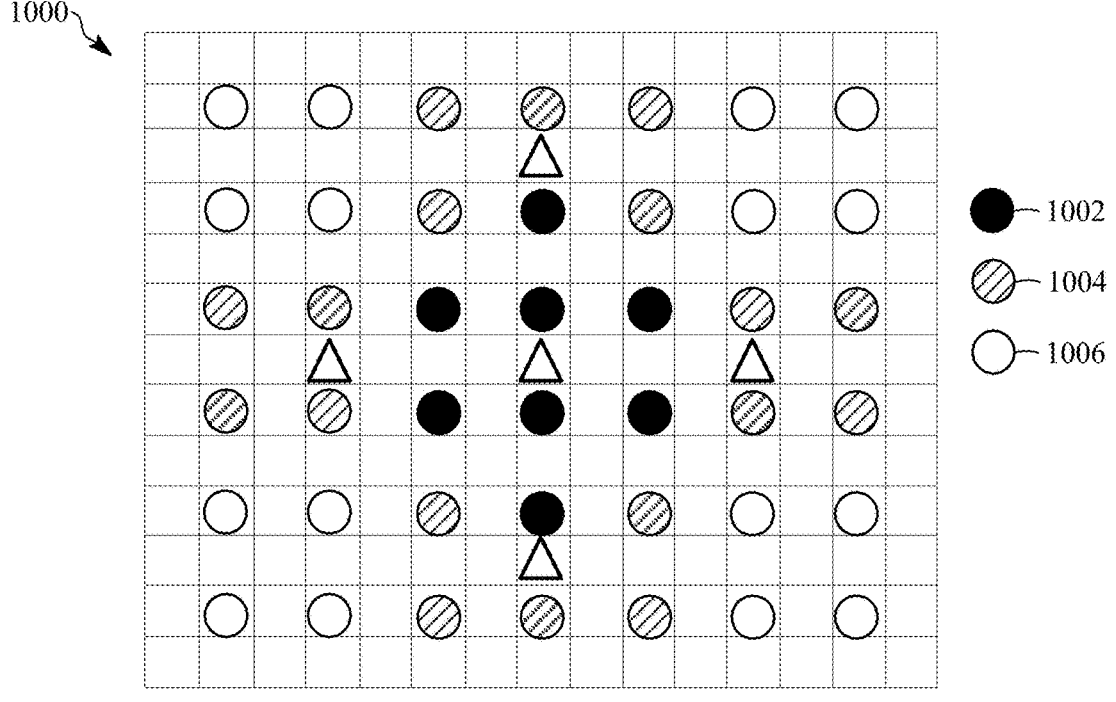
FIG. 10 illustrates examples of samples usable for con-volutional cross-component model prediction.

FIG. 10 illustrates examples of samples usable for CCCM prediction. As shown in FIG. 10, Type-0 chroma locations in 4:2:0 format are used, triangles represent chroma samples, and circles represent luma samples, in which certain of those luma samples are filled with solid colors or patterns 1002, 1004, and 1006. The luma samples filled with the solid color 1002 (black) correspond to luma samples surrounding a middle chroma sample to be predicted and thus which may be used for predicting that middle chroma sample. The luma samples filled with the pattern 1004, together with the luma samples filled with the solid color 1002, comprise a region of the reference area 1000 which may be used for a current CU under processing. The luma samples with the solid color 1006 (white) correspond to a padded region for the reference area 1000. In that the luma and chroma components are formatted in 4:2:0, the blocks thereof are not identically sized.

Typical CCCM prediction processes use seven taps as filter coefficients to determine (e.g., calculate) a predicted chroma sample using various input sample data. In particular, and as described above, typical CCCM prediction calculates a predicted chroma value, predChromaVal, using taps $c_i$, in which the value of i is from 0 to 6, inclusive, represented as predChromaVal=$c_0$C+$c_1$N+$c_2$S+$c_3$E+$c_4$W+$c_5$P+$c_6$B, in which C, N, S, E, W, P, and B refer to samples the values of which are modified by the respective taps. The taps $c_i$ are determined by minimizing an MSE between predicted and reconstructed chroma samples in a reference area corresponding to one or more CTUs including a current CTU that includes the CU under prediction. However, also as described above, the use of seven taps for CCCM prediction imposes substantial latency especially in the hardware coding use case.

To address this, and as will be further described with respect to FIGS. 11-14, the implementations of this disclosure teach approaches for constraining the number of taps to use to perform CCCM prediction. In particular, tap-constrained CCCM prediction according to the implementations of this disclosure includes determining a number of taps to which to limit a performance of CCCM prediction for a block based on one or more of a size of the block or whether the block is downsampled. Multiple CCCM prediction models are each associated with a different number and/or combination of taps corresponding to the number of samples used by the respective models. For example, a prediction model of the multiple CCCM prediction models can use (i.e., to calculate a predicted chroma value) 3, 4, 5, or 6 taps.

In one example, a prediction model uses 3 taps, which correspond to the collocated luma sample (i.e., a luma sample from the same frame as and collocated with the chroma sample to predict), a non-linear term of the collocated luma sample (e.g., a square or square root of the collocated luma sample, for example, a power of two of the current luma sample scaled to a sample value range of the video that includes the block under processing and based on a bit precision of the video, for example, 8-bit or 10-bit), and a bias term based on the bit-depth of the luma/chroma component (i.e., the bit precision input parameter for the video). In some such cases, a prediction model using 3 taps may only be used for a block in the 4-4-4 use case or if the block is (i.e., the luma values thereof are) downsampled (e.g., as described with respect to FIG. 9) in non-4-4-4 use cases.

In one example, a prediction model uses 4 taps and is only used for a block that is in 4-4-4 (or non-4-4-4, where the block is downsampled) use cases, in which the taps correspond to the collocated luma sample, a non-linear term of the collocated luma sample, and two spatially neighboring luma samples of the collocated luma sample. With this model, no bias term is used. In some such cases, the two neighboring samples are the left and right samples of the collocated luma sample. In other such cases, the two neighboring samples are the above and below samples of the collocated luma sample. Opposing neighboring samples are used in either case to provide a gradient value. This prediction model is used for downsampled blocks because the collocated luma sample will be in a same position as the chroma sample to predict. Thus, were the prediction model to be used for a non-downsampled block, the collocated luma sample would be in a different position than the chroma sample to predict, resulting in a sub-optimal prediction.

In one example, a prediction model uses 4 taps and is only used for a block that is non-downsampled in non-4-4-4 use cases, in which the taps include the collocated luma sample, two spatially neighboring luma samples of the collocated luma sample, and a non-linear term of another spatially neighboring luma sample of the collocated luma sample. In some such cases, the two neighboring samples are the left and right samples of the collocated luma sample and the non-linear term is an above or below neighbor of the collocated luma sample, in which the chroma sample is between the collocated luma sample and the non-linear term. In other such cases, the two neighboring samples are the above and below samples of the collocated luma sample and the non-linear term is a left or right neighbor of the collocated luma sample, in which the chroma sample is between the collocated luma sample and the non-linear term. This prediction model is used for non-downsampled blocks because the collocated luma sample will be in a different position than the chroma sample to predict. Thus, were the prediction model to be used for a downsampled block, the collocated luma sample would be in a same position as the chroma sample to predict, resulting in a sub-optimal prediction.

In one example, a prediction model uses 5 taps and is only used for a block that is non-downsampled in non-4-4-4 use cases, in which the taps include the collocated luma sample, a non-linear term of the collocated luma sample, and three spatially neighboring samples of the collocated luma samples, in which the collocated luma sample and the three spatially neighboring samples of the collocated luma sample surround the chroma sample each in one of the above, below, left, right, above-left diagonal, above-right diagonal, below-left diagonal, or below-right diagonal positions. This prediction model is used for non-downsampled blocks because the collocated luma sample will be in a different position than the chroma sample to predict. Thus, were the prediction model to be used for a downsampled block, the collocated luma sample would be in a same position as the chroma sample to predict, resulting in a sub-optimal prediction.

Figure 11:
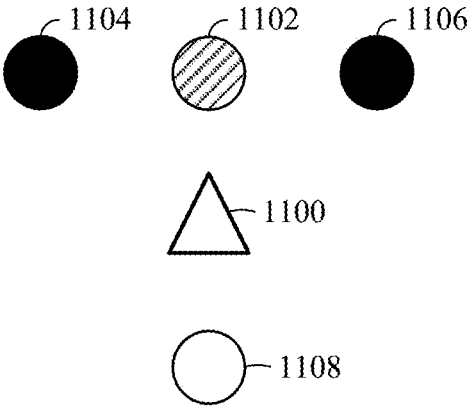
FIGS. 11-12 illustrate example samples representative of numbers of taps for which different convolutional cross-component prediction models are limited.
Figure 12:
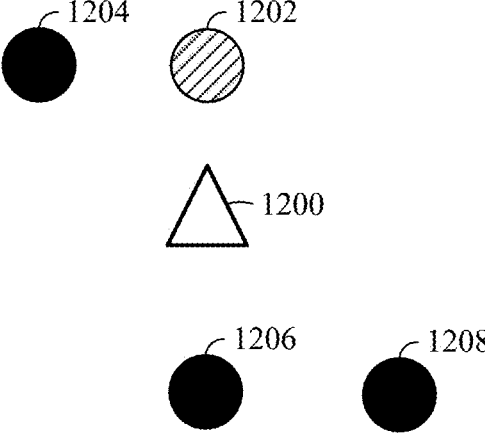

FIGS. 11-12 illustrate example samples representative of numbers of taps for which different convolutional cross-component prediction models are limited. Referring first to FIG. 11, a 4-tap prediction model is used in which a chroma sample 1100 is surrounded by each of the 4 taps. In particular, the prediction model used to predict the chroma sample 1100 may be the 4-tap prediction model used for non-downsampled blocks, described above. A collocated luma sample 1102 of the chroma sample 1100 is above the chroma sample 1100 and each of two spatially neighboring luma samples 1104 and 1106 surrounds the collocated luma sample 1102 in opposing directions-here, to the left and right of the collocated luma sample 1102. A non-linear term 1108 is used as an additional neighboring luma sample below the chroma sample 1100. The non-linear term 1108 improves the accuracy of the prediction model by introducing a sample value from a side of the chroma sample 1100 opposite to that in which the luma samples 1102 through 1106 are positioned (i.e., generally above the chroma sample 1100, as shown).

Referring next to FIG. 12, a 5-tap prediction model is used in which a chroma sample 1200 is surrounded by each of 4 of the 5 taps and a 5th tap is provided other than as a collocated or spatially neighboring value of the chroma sample 1200. In particular, the prediction model used to predict the chroma sample 1200 may be the 5-tap prediction model used for non-downsampled blocks, described above. A collocated luma sample 1202 of the chroma sample 1200 is above the chroma sample 1200. Each of three spatially neighboring luma samples 1204 through 1208 surround the chroma sample 1200 from a different position—as shown, the spatially neighboring luma sample 1204 is in an above-left diagonal position relative to the chroma sample 1200 and thus to the left of the collocated luma sample 1202, the spatially neighboring luma sample 1206 is in a below position relative to the chroma sample 1200 and thus oppos-ing the collocated luma sample 1202, and the spatially neighboring luma sample 1208 is in a below-right diagonal position relative to the chroma sample 1200 and thus to the right of the spatially neighboring luma sample 1206. A non-linear term (not shown) may operate as a square or a square root of the collocated luma sample 1202. In some cases, however, the non-linear term may instead be expressed as a fourth spatially neighboring luma sample.

Figure 13:
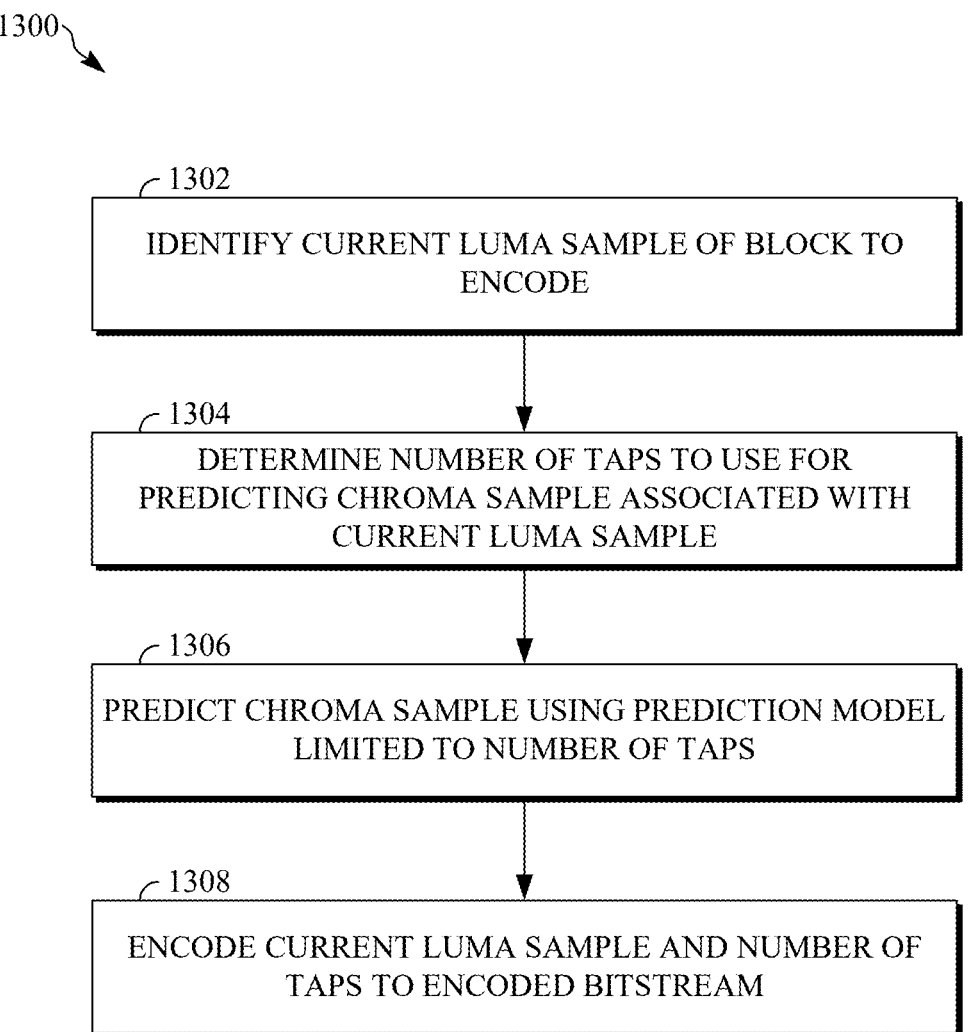
FIG. 13 is a flowchart diagram of an example of an encoder-side technique for tap-constrained convolutional cross-component model prediction.
Figure 14:
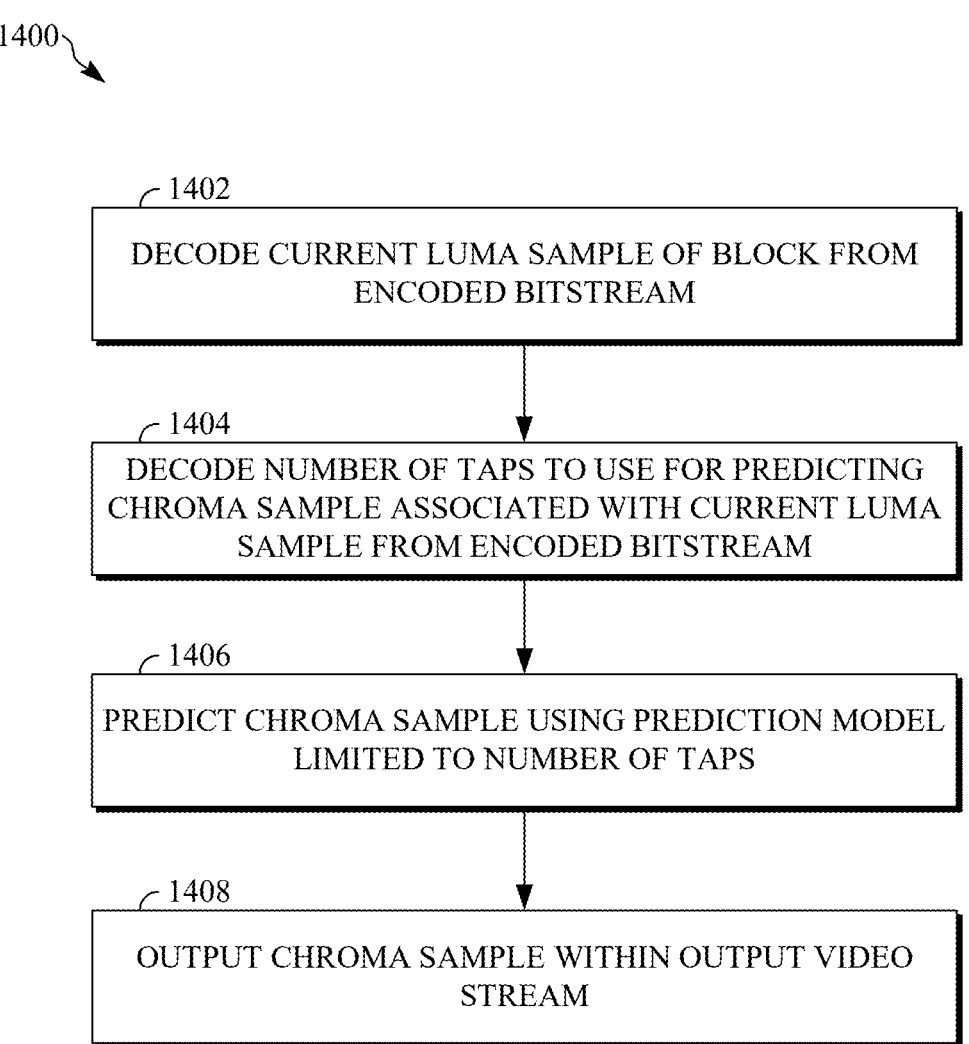
FIG. 14 is a flowchart diagram of an example of a decoder-side technique for tap-constrained convolutional cross-component model prediction.

Further details of techniques for tap-constrained convo-lutional cross-component model prediction are now described. FIG. 13 is a flowchart diagram of an example of an encoder-side technique 1300 for tap-constrained convo-lutional cross-component model prediction. FIG. 14 is a flowchart diagram of an example of a decoder-side tech-nique 1400 for tap-constrained convolutional cross-compo-nent model prediction. The techniques 1300 and 1400 may respectively, for example, be wholly or partially performed at a prediction stage of an encoder used to encode a video stream (e.g., the intra/inter prediction stage 402) or a pre-diction stage of a decoder used to decode a bitstream (e.g., the intra/inter prediction stage 508).

The techniques 1300 and 1400 can each be implemented, for example, as a software program that may be executed by computing devices such as the transmitting station 102 or the receiving station 106. For example, the software pro-gram can include machine-readable instructions that may be stored in a memory such as the memory 204 or the second-ary storage 214, and that, when executed by a processor, such as the processor 202, may cause the computing device to perform the technique 1300 and/or the technique 1400. The technique 1300 and the technique 1400 can be imple-mented using specialized hardware or firmware. For example, a hardware component, such as a hardware coder, may be configured to perform the technique 1300 and/or the technique 1400. As explained above, some computing devices may have multiple memories or processors, and the operations described in the technique 1300 and the tech-nique 1400 can be distributed using multiple processors, memories, or both. For simplicity of explanation, the tech-nique 1300 and the technique 1400 are each depicted and described herein as a series of steps or operations. However, the steps or operations in accordance with this disclosure can occur in various orders and/or concurrently. Additionally, other steps or operations not presented and described herein may be used. Furthermore, not all illustrated steps or opera-tions may be required to implement a technique in accor-dance with the disclosed subject matter.

Referring first to FIG. 13, the encoder-side technique 1300 for tap-constrained CCCM prediction is shown. At 1302, a current luma sample of a block (e.g., a CU) to encode is identified. The block includes luma samples from which chroma samples can be predicted using CCCM pre-diction. The block may be downsampled or non-down-sampled. The current luma sample is identified as a collo-cated luma sample to a chroma sample to predict.

At 1304, a number of taps to use for predicting the chroma sample associated with (e.g., from or for) the current luma sample is determined. The taps are CCCM prediction filter coefficients (e.g., ones of the filter coefficients $c_i$ described above). In particular, the number of taps to use is determined based on one or more of a size of the block or whether the block is downsampled.

Determining the number of taps based on a size of the block can include comparing the size of the block to a threshold associated with a number of chroma samples. Where the size of the block meets the threshold, such that the block based on its size is understood to include at least the threshold number of chroma samples, a number of taps may be deemed available for use with the block. For example, where the threshold is 64 chroma samples and the size of the block is 8×8, 16×4, or 16×8 (amongst others), the block meets the threshold in that it has (or will have following prediction) at least 64 chroma samples. In one example, prediction models using 3 or 4 taps may be used for the block regardless of whether the block meets the threshold, while prediction models using 5 taps or 6 taps may only be used for the block where it meets the threshold. Thus, where the block is large enough to meet the threshold, the tech-nique 1300 determined to use a relatively larger number of taps; however, where the block is not large enough to meet the threshold, the technique 1300 determines to use a relatively smaller number of taps to prevent the computa-tional cost and thus latency involved in the CCCM predic-tion from becoming burdensome to the hardware encoder.

Determining the number of taps based on whether the block is downsampled can include determining whether the current luma sample and/or one or more other luma samples of the block are downsampled. For example, where they are downsampled, the number of taps may be limited to 3 or 4; however, where they are not downsampled, the number of taps may be limited to 4 or 5.

In at least some cases, determining the number of taps can include determining the prediction model to use to predict the chroma sample associated with the current luma sample. The prediction model is a CCCM prediction model and may be one of multiple CCCM prediction models available for encoding the block, in which each of the multiple prediction models uses a different number of taps and/or a different combination of taps. For example, a first prediction model can use 3 taps including a collocated luma sample, a non-linear term, and a bias term. In another example, a second prediction model can use 4 taps including a collo-cated luma sample, a non-linear term of the collocated luma sample, and two spatially neighboring luma samples of the collocated luma sample. In yet another example, a third prediction model can use 4 taps including a collocated luma sample, two spatially neighboring luma samples of the collocated luma sample, and a non-linear term of another spatially neighboring luma sample of the collocated luma sample. In still a further example, a fourth prediction model can use 5 taps including a collocated luma sample, a non-linear term of the collocated luma sample, and three spatially neighboring samples of the collocated luma samples.

Determining the prediction model can include determining the number of taps based on the one or more of the size of the block or whether the block is downsampled, such as to determine a subset of prediction models to evaluate (e.g., all 3- and 4-tap prediction models, such as where the block is downsampled and the size thereof does not meet the threshold). The hardware encoder can then evaluate the subset of prediction models to determine (e.g., using MSE or another metric) the prediction model of the subset that achieves a lowest computational complexity with a coding gain. That prediction model is then selected, and the number of taps it uses is determined as the number of taps.

At 1306, the chroma sample is predicted using the determined prediction model, as a prediction model limited to the number of taps. Predicting the chroma sample includes deriving values of the taps of the number of taps. For example, the values of the taps may be derived by minimizing an MSE between the predicted and reconstructed chroma samples in a reference area. In particular, the reference area from which samples are obtained and used to derive the values of the taps may include a spatial neighborhood of the current luma sample, for example, as shown in FIG. 11 or 12. The size of the reference area may be based on the number of taps determined to use. For example, where 3 taps are used, the reference area may be one-sample in height, for the area above the current luma sample, and one sample in width, for the area to the left of the current luma sample. This area provides the 3 samples that will be needed as input values, described below.

Predicting the chroma sample further includes determining input values to which the taps of the number of taps will be applied. For example, the input values may correspond to a combination of the current luma sample, one or more spatially neighboring luma samples of the current luma sample, a non-linear term (e.g., as another spatially neighboring luma sample or otherwise), or a bias term. The chroma sample is then predicted using those input values and the number of taps to which the prediction model is limited. For example, each of those input values may be weighted using one of the taps. The predicted chroma sample may accordingly be calculated based on those weighted input values.

At 1308, the current luma sample and the number of taps are signaled within (i.e., encoded to) an encoded bitstream. For example, the number of taps may be signaled within a slice header that corresponds to the block to which the chroma sample corresponds. In some cases, the prediction model itself may also or instead (e.g., in place of the number of taps) be signaled within the encoded bitstream. In some cases, the predicted chroma sample may also be signaled within the encoded bitstream.

Referring next to FIG. 14, the decoder-side technique 1400 for tap-constrained CCCM prediction is shown. At 1402, a current luma sample of a block (e.g., a CU) to decode is decoded from an encoded bitstream. The block includes luma samples from which chroma samples can be predicted using CCCM prediction. The block may be downsampled or non-downsampled. The current luma sample is identified as a collocated luma sample to a chroma sample to predict. The current luma sample may be signaled within the encoded bitstream using one or more syntax elements which, when decoded, provide the current luma sample.

At 1404, a number of taps to use for predicting a chroma sample associated with the current luma sample is decoded from the encoded bitstream. The taps of the number of taps are convolutional cross-component model prediction filter coefficients. The number of taps may be signaled within the encoded bitstream using one or more syntax elements which, when decoded, provide the number of taps. The number of taps is based on one or more of a size of the block or whether the block is downsampled. For example, the number of taps may be determined during encoding as described above with respect to the technique 1300 shown in FIG. 13. In some such cases, where the number of taps is based on the size of the block, the number of taps is based on a comparison of the size of the block against a threshold number of chroma samples for the block to include. For example, where the number of taps is based on the size of the block and the size of the block meets a threshold number of chroma samples, the number of taps is a first number, and where the number of taps is based on the size of the block and the size of the block does not meet the threshold number of chroma samples, the number of taps is a second number that is less than the first number. In other such cases, where the number of taps is based on whether the block is downsampled, the number of taps is based on whether one or both of the current luma sample or one or more other luma samples of the block are downsampled. For example, where the number of taps is based on whether the block is downsampled and the block is downsampled, the number of taps is a first number, and where the number of taps is based on whether the block is downsampled and the block is not downsampled, the number of taps is a second number greater than the first number.

At 1406, the chroma sample is predicted using a prediction model limited to the number of taps. For example, predicting the chroma sample can include predicting the chroma sample as described above with respect to the technique 1300. In some such cases, predicting the chroma sample using the prediction model limited to the number of taps can include determining first values of taps of the number of taps based on predicted and reconstructed chroma samples in a reference area associated with a spatial neighborhood of the current luma sample, determining second values of samples of the prediction model, and weighting the second values using the first values. For example, a size of the reference area is based on the number of taps. In some cases, the prediction model is one of a first prediction model using, as the number of taps, three taps including a collocated luma sample, a non-linear term, and a bias term; a second prediction model using, as the number of taps, four taps including a collocated luma sample, a non-linear term of the collocated luma sample, and two spatially neighboring luma samples of the collocated luma sample; a third prediction model using, as the number of taps, four taps including a collocated luma sample, two spatially neighboring luma samples of the collocated luma sample, and a non-linear term of another spatially neighboring luma sample of the collocated luma sample; or a fourth prediction model using, as the number of taps, five taps including a collocated luma sample, a non-linear term of the collocated luma sample, and three spatially neighboring samples of the collocated luma samples. In some cases, the prediction model used to predict a chroma sample from the current luma sample during encoding may also be or instead (i.e., in addition to or as an alternative to the number of taps) be decoded from the encoded bitstream.

At 1408, the chroma sample is output within an output video stream. For example, the chroma sample may be included in and used to produce a reconstructed block, which may be included in a reconstructed frame output as part of the output video stream at an end user device.

The aspects of encoding and decoding described above illustrate some examples of encoding and decoding techniques. However, it is to be understood that encoding and decoding, as those terms are used in the claims, could mean compression, decompression, transformation, or any other processing or change of data.

The word "example" is used herein to mean serving as an example, instance, or illustration. Any aspect or design described herein as "example" is not necessarily to be construed as being preferred or advantageous over other aspects or designs. Rather, use of the word "example" is intended to present concepts in a concrete fashion. As used in this application, the term "or" is intended to mean an inclusive "or" rather than an exclusive "or." That is, unless specified otherwise or clearly indicated otherwise by the context, the statement "X includes A or B" is intended to mean any of the natural inclusive permutations thereof. That is, if X includes A; X includes B; or X includes both A and B, then "X includes A or B" is satisfied under any of the foregoing instances. In addition, the articles "a" and "an" as used in this application and the appended claims should generally be construed to mean "one or more," unless specified otherwise or clearly indicated by the context to be directed to a singular form. Moreover, use of the term "an implementation" or the term "one implementation" throughout this disclosure is not intended to mean the same implementation unless described as such.

Implementations of the transmitting station 102 and/or the receiving station 106 (and the algorithms, methods, instructions, etc., stored thereon and/or executed thereby, including by the encoder 400 and the decoder 500, or another encoder or decoder as disclosed herein) can be realized in hardware, software, or any combination thereof. The hardware can include, for example, computers (e.g., apparatuses), intellectual property (IP) cores, application-specific integrated circuits (ASICs), programmable logic arrays, optical processors, programmable logic controllers, microcode, microcontrollers, servers, microprocessors, digital signal processors, or any other suitable circuit. In the claims, the term "processor" should be understood as encompassing any of the foregoing hardware, either singly or in combination. The terms "signal" and "data" are used interchangeably. Further, portions of the transmitting station 102 and the receiving station 106 do not necessarily have to be implemented in the same manner.

Further, in one aspect, for example, the transmitting station 102 or the receiving station 106 can be implemented using a general purpose computer or general purpose processor with a computer program that, when executed, carries out any of the respective methods, algorithms, and/or instructions described herein. In addition, or alternatively, for example, a special purpose computer/processor can be utilized which can contain other hardware for carrying out any of the methods, algorithms, or instructions described herein.

The transmitting station 102 and the receiving station 106 can, for example, be implemented on computers in a video conferencing system. Alternatively, the transmitting station 102 can be implemented on a server, and the receiving station 106 can be implemented on a device separate from the server, such as a handheld communications device. In this instance, the transmitting station 102 can encode content into an encoded video signal and transmit the encoded video signal to the communications device. In turn, the communications device can then decode the encoded video signal. Alternatively, the communications device can decode content stored locally on the communications device, for example, content that was not transmitted by the transmitting station 102. Other suitable transmitting and receiving implementation schemes are available. For example, the receiving station 106 can be a generally stationary personal computer rather than a portable communications device.

Further, all or a portion of implementations of this disclosure can take the form of a computer program product accessible from, for example, a computer-usable or computer-readable medium. A computer-usable or computer-readable medium can be any device that can, for example, tangibly contain, store, communicate, or transport the program for use by or in connection with any processor (e.g., a non-transitory computer readable medium including program instructions executable by one or more processors). The medium can be, for example, an electronic, magnetic, optical, electromagnetic, or semiconductor device. Other suitable mediums are also available.

The above-described implementations and other aspects have been described in order to facilitate easy understanding of this disclosure and do not limit this disclosure. On the contrary, this disclosure is intended to cover various modifications and equivalent arrangements included within the scope of the appended claims, which scope is to be accorded the broadest interpretation as is permitted under the law so as to encompass all such modifications and equivalent arrangements.

What is claimed is:

1. A method for tap-constrained convolutional cross-component model prediction, the method comprising:
   decoding a current luma sample of a block from an encoded bitstream;
   decoding a number of taps to use for predicting a chroma sample associated with the current luma sample from the encoded bitstream, wherein the number of taps is based on one or more of a size of the block or whether the block is downsampled, and wherein taps of the number of taps are convolutional cross-component model prediction filter coefficients;
   predicting the chroma sample using a prediction model limited to the number of taps; and
   outputting the chroma sample within an output video stream.

2. The method of claim 1, wherein, where the number of taps is based on the size of the block, the number of taps is based on a comparison of the size of the block against a threshold number of chroma samples for the block to include.

3. The method of claim 1, wherein, where the number of taps is based on whether the block is downsampled, the number of taps is based on whether one or both of the current luma sample or one or more other luma samples of the block are downsampled.

4. The method of claim 1, wherein the prediction model is one of:
   a first prediction model using, as the number of taps, three taps including a collocated luma sample, a non-linear term, and a bias term,
   a second prediction model using, as the number of taps, four taps including a collocated luma sample, a non-linear term of the collocated luma sample, and two spatially neighboring luma samples of the collocated luma sample,
   a third prediction model using, as the number of taps, four taps including a collocated luma sample, two spatially neighboring luma samples of the collocated luma sample, and a non-linear term of another spatially neighboring luma sample of the collocated luma sample, or a fourth prediction model using, as the number of taps, five taps including a collocated luma sample, a non-linear term of the collocated luma sample, and three spatially neighboring samples of the collocated luma samples.

5. The method of claim 4, wherein the prediction model is signaled within the associated with encoded bitstream.

6. The method of claim 1, wherein predicting the chroma sample using the prediction model limited to the number of taps comprises:

determining first values of taps of the number of taps based on predicted and reconstructed chroma samples in a reference area associated with a spatial neighborhood of the current luma sample;

determining second values of samples of the prediction model; and weighting the second values using the first values.

7. The method of claim 6, wherein a size of the reference area is based on the number of taps.

8. A non-transitory computer readable medium having stored thereon an encoded bitstream, wherein the encoded bitstream is configured for decoding by operations comprising:

decoding, from the encoded bitstream, a current luma sample of a block and a number of taps to use for predicting a chroma sample associated with the current luma sample, wherein the number of taps is based on one or more of a size of the block or whether the block is downsampled, and wherein taps of the number of taps are convolutional cross-component model prediction filter coefficients;

predicting the chroma sample using a prediction model limited to the number of taps; and outputting the chroma sample within an output video stream.

9. The non-transitory computer readable medium of claim 8, wherein, where the number of taps is based on the size of the block and the size of the block meets a threshold number of chroma samples, the number of taps is a first number, and where the number of taps is based on the size of the block and the size of the block does not meet the threshold number of chroma samples, the number of taps is a second number less than the first number.

10. The non-transitory computer readable medium of claim 8, wherein, where the number of taps is based on whether the block is downsampled and the block is downsampled, the number of taps is a first number, and where the number of taps is based on whether the block is downsampled and the block is not downsampled, the number of taps is a second number greater than the first number.

11. The non-transitory computer readable medium of claim 8, wherein the prediction model is signaled within the encoded bitstream.

12. An apparatus for tap-constrained convolutional cross-component model prediction, the apparatus comprising:

a memory; and a processor configured to execute instructions stored in the memory to:

predict, using a prediction model limited to a number of taps, a chroma sample associated with a current luma sample of a block, wherein the number of taps is based on one or more of a size of the block or whether the block is downsampled, and wherein taps of the number of taps are convolutional cross-component model prediction filter coefficients; and output the chroma sample within an output video stream.

13. The apparatus of claim 12, wherein, where the number of taps is based on the size of the block, the number of taps is based on a comparison of the size of the block against a threshold number of chroma samples for the block to include, and where the number of taps is based on whether the block is downsampled, the number of taps is based on whether one or both of the current luma sample or one or more other luma samples of the block are downsampled.

14. The apparatus of claim 13, wherein the number of taps is a first number of taps where the size of the block meets the threshold number of chroma samples or a second number of taps where the size of the block does not meet the threshold number of chroma samples, and wherein the first number of taps is greater than the second number of taps.

15. The apparatus of claim 13, wherein the number of taps is a first number of taps where the block is downsampled or a second number of taps where the block is not downsampled, and wherein the first number of taps is greater than the second number of taps.

16. The apparatus of claim 12, wherein the processor is configured to execute the instructions to:

decode the number of taps and the current luma sample from an encoded bitstream.

17. The apparatus of claim 12, wherein the prediction model uses, as the number of taps, three taps including a collocated luma sample, a non-linear term, and a bias term.

18. The apparatus of claim 12, wherein the prediction model uses, as the number of taps, four taps including a collocated luma sample, a non-linear term of the collocated luma sample, and two spatially neighboring luma samples of the collocated luma sample.

19. The apparatus of claim 12, wherein the prediction model uses, as the number of taps, four taps including a collocated luma sample, two spatially neighboring luma samples of the collocated luma sample, and a non-linear term of another spatially neighboring luma sample of the collocated luma sample.

20. The apparatus of claim 12, wherein the prediction model uses, as the number of taps, five taps including a collocated luma sample, a non-linear term of the collocated luma sample, and three spatially neighboring samples of the collocated luma samples.

* * * * *